Figures 1, 2, 3:
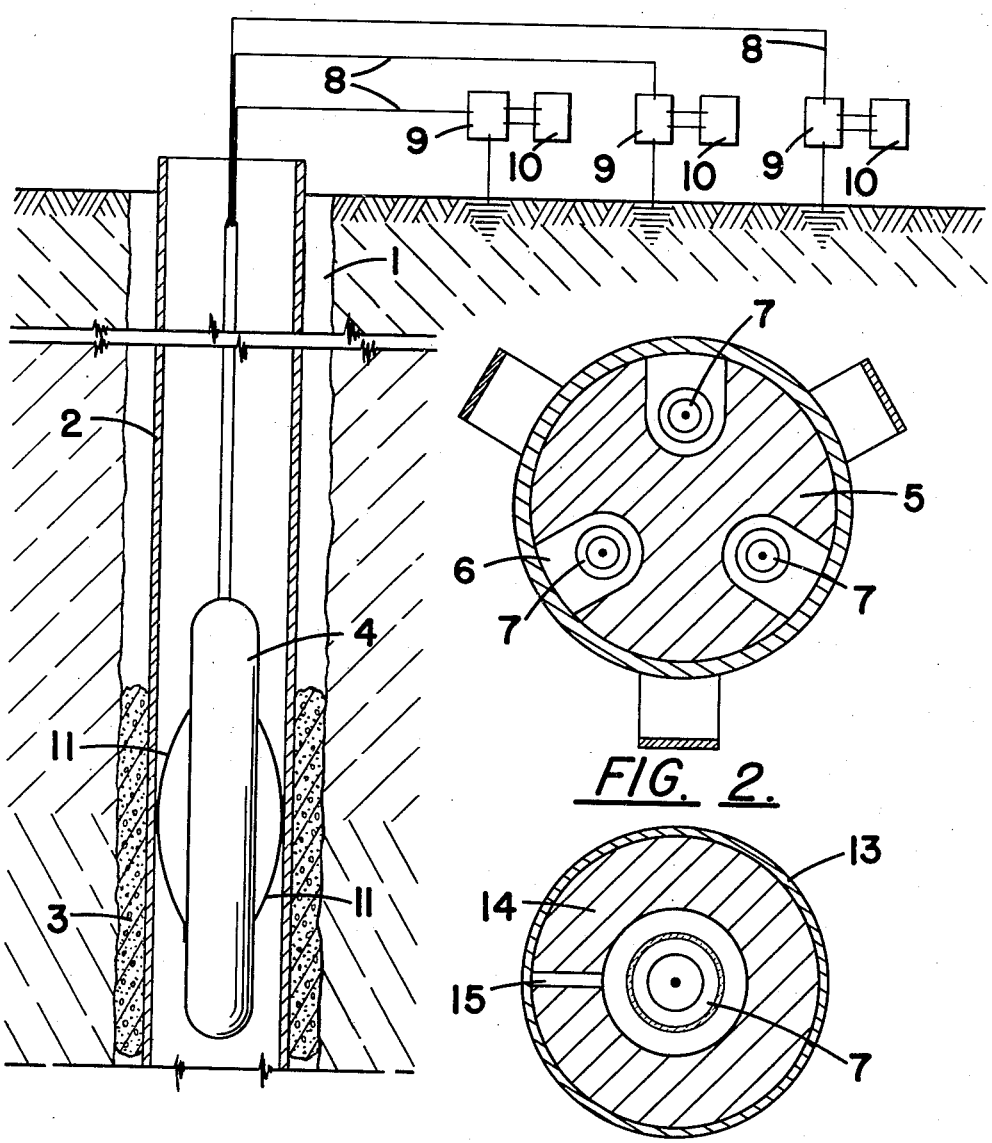

June 22, 1943.  L. G. HOWELL ET AL  2,322,634
METHOD AND APPARATUS FOR LOGGING BOREHOLES
Filed June 23, 1941

Lynn G. Howell
Ludwig W. Blau  INVENTORS
BY  P. J. Whelan
ATTORNEY

Patented June 22, 1943

2,322,634

UNITED STATES PATENT OFFICE 2,322,634

METHOD AND APPARATUS FOR LOGGING BOREHOLES

Lynn G. Howell and Ludwig W. Blau, Houston, Tex., assignors to Standard Oil Development Company, a corporation of Delaware Application June 23, 1941, Serial No. 399,328

7 Claims. (Cl. 250—83.6)

The present invention is directed to gamma-ray well logging.

It has already been proposed in U. S. Patent No. 2,220,205, entitled "Detectable cement for boreholes, and method for locating same" to add to cement which is used in the setting of casing in boreholes a radioactive material such as carnotite, and then to determine the height to which the cement rises behind the casing by passing a detector for gamma-ray radiations along the casing.

One of the objects of the present invention is to provide a means whereby the height of the cement on different sides of the casing may be determined so as to ascertain whether or not there is a symmetrical distribution of cement behind the casing. The provision of such means is of particular importance in so-called squeeze cement jobs which have for their object usually the sealing off of certain formations at selected depths in a borehole. For the attainment of this objective, it is necessary that the cement be distributed all around the casing.

A further object of the present invention is the provision of a method and means for ascertaining the direction of dip of certain formations traversed by a borehole.

The attainment of the aforesaid objects is realized according to the present invention by arranging one or more radioactive sensitive devices in a borehole bomb in such a way that the response of these devices will have a directional significance. In one embodiment of this invention a single detector for radioactive radiations is arranged in a casing provided with a shield having only a narrow vertical slit so that the only radiations recorded are those which come from the direction in which the slit faces. In this embodiment there is provided means for fixing the direction in which the slit faces.

In another embodiment of the present invention a plurality of devices sensitive to gamma-ray radiations are arranged symmetrically with respect to the center of a borehole bomb and are shielded from each other so that each device responds only to radiations coming from the direction in which it faces. For the purpose of determining qualitatively whether or not cement is uniformly disposed around the casing, this embodiment of the casing does not require the use of orienting means, but for the purpose of determining on what side of the casing cement has not been deposited such orienting means must be utilized. Such means is necessary also where the device is used for determining the direction of the dip of formations which are traversed by the borehole.

In the accompanying drawing Figure 1 is a vertical section through a borehole in which a device according to the present invention is shown in position. Figure 2 is a cross section of the bomb shown in Figure 1, and Figure 3 is a cross section of a modified form of bomb.

Referring to Figure 1 in detail, numeral 1 designates a borehole traversing various substrata and provided with a casing 2 which is set in place by cement 3.

The device according to the present invention consists of a bomb 4 which is a steel bomb of sufficient thickness to withstand the pressures encountered in the borehole and which is made fluid-tight. Arranged in the bomb is a body of lead or similar material 5 which is provided with longitudinal recesses 6 of such configuration as to form seals for gamma-ray responsive devices 7. Suitable devices for the detection of gamma-rays are ionization chambers and Geiger counters which are well known in the art. One form of gamma-ray detector is shown in co-pending application Serial No. 224,504, filed August 12, 1938, and comprises an ionization chamber the output of which is fed to an electrometer tube which produces electrical pulses. It will be understood, while the radiation responsive device is shown only symbolically in the accompanying drawing, that each cell 6 contains a complete detector of the character shown in said application Ser. No. 224,504. Each of the detectors has a separate output conductor 8 and each of these conductors is connected at the surface with a separate amplifier 9 and a separate recorder 10. It will be understood that the recorder is conventionally a photographic galvanometer which produces a record on a moving strip of film, the record being referred to as a log.

As will be apparent from the foregoing description, the bomb lowered into the borehole is very heavy and, therefore, tends of its own weight, to resist movement. Such being the case, sufficiently accurate orientation can be realized by providing spring members 11 secured to the outer surface of the bomb at spaced intervals circumferentially thereof and extending laterally thereof sufficiently to brush against the casing 2 in the well. The friction between these spring members and the casing will ordinarily be sufficient to prevent the turning of the bomb in its travel through the casing. In this connection, it may be noted that it is desirable to use for the suspension of the bomb a cable of the non-twisting type, many varieties of which are available on the market. The spring members 11 also serve the purpose of maintaining all of the detectors at a substantially uniform distance from the casing to thereby insure greater reliability of the records.

In using this device, the operator can face the respective detectors in selected directions at the surface. The detectors may be so connected to the recording system, as by differently colored wires, that the operator knows which recorder is recording the response of each detector. Knowing this, the operator can determine from the records what side of the casing is deficient in cement, if such a condition exists. It will be understood that any desired number of detectors can be employed but, for ordinary purposes, three detectors give satisfactory results.

Likewise, when the device is to be used for the determination of the direction of dip of the substrata traversed by the borehole, the direction in which the respective detectors are faced is noted at the surface so that the records produced can be designated directionally. When the bomb is lowered, the predetermined orientation is maintained by the brush arrangement described. When this is done, the interfaces of the substrata which are traversed will show up at different depths on the respective records when the substrata is inclined to the horizontal. With a knowledge of the direction in which the various detectors are faced, the operator can determine from the difference in depths at which the interfaces appear on the respective logs the direction in which any given substrata is dipping. This is particularly useful in cases where the borehole passes through a fault.

While one expedient for maintaining predetermined orientation of the detectors has been illustrated, it will be evident that other expedients can be utilized. A more accurate control, for example, may be realized by the utilization of a gyroscopic compass. Gyroscopes have previously been used in borehole devices, particularly in borehole inclinometers, and the manner of adapting them to borehole devices is well known. Typical patents showing such devices are No. 1,812,994, issued July 7, 1931 to O. A. Sperry, and No. 1,837,479, issued December 22, 1931 to Pew et al.

In the modification shown in Figure 3 only a single detector 7 is employed and this is arranged concentrically in a steel chamber 13 which is of sufficient strength to withstand the pressures encountered and which encases a sheath of lead or similar material 14, which on one side is provided with a longitudinal slit 15. The thickness of the lead sheath is so selected that no natural gamma-ray emanations which are encountered in the borehole can penetrate it. A thickness of about 2 in. will insure sufficient shielding of the detector to enable the operator to conclude that the response is due primarily to radiations passing through the longitudinal slit 15. When this latter embodiment is used, it is necessary to make several runs in order to impart directional significance to the results. This, of course, will be done by bringing the bomb to the surface after each run and reorienting it. For the purpose of determining whether or not cement is uniformly distributed in a borehole, this orienting procedure can be omitted. In this case, no means is provided for holding the slit in any fixed circumferential position. Rather, when the recorder shows by its response that the top of the cement has been reached, the bomb can be rotated at this point by applying a twist to the cable at the surface and observing the effect on the record.

Variations in the procedure and apparatus described above will occur to those skilled in the art. Such variations, insofar as they do not involve an inventive departure from the apparatus and procedure outlined above, are contemplated within the scope of the appended claims.

The nature and objects of the present invention having been thus described and illustrated, what is claimed as new and useful and is desired to be secured by Letters Patent is:

1. A method for determining the distribution of radioactive material around a borehole, which comprises making a plurality of radioactive measurements inside the borehole, each measurement being confined to a selected direction by maintaining the azimuthal position of the detector substantially constant during the measurement, and the different measurements being made in different directions.

2. A method for determining the distribution of radioactivity around a borehole which comprises making a plurality of measurements of the variation of radioactivity with depth inside the borehole, each measurement being confined to a selected direction by maintaining the azimuthal position of the detector substantially constant during the measurement, and the different measurements being made in different directions.

3. A method for determining the distribution of radioactive material around a cased borehole, which comprises making a plurality of radioactive measurements inside the casing, each measurement being confined to a selected direction by maintaining the azimuthal position of the detector substantially constant during the measurement, and the different measurements being made in different directions.

4. A method for determining the distribution of radioactive material around a borehole, which comprises lowering into a borehole a radioactivity measuring device capable of responding to radioactive rays striking it from a selected direction, maintaining the azimuthal position of said measuring device substantially constant during its movement, continuously recording the responses of said measuring device during its movement, and repeating said operation a plurality of times while holding the direction of response of said device in a different azimuth for each operation.

5. A method for determining the distribution of radioactive material around a borehole which comprises lowering into the borehole a bomb containing a plurality of detectors of radioactivity spaced circumferentially from each other, each detector being shielded from the others and being shielded from radioactive rays other than those arriving from a direction substantially radially to said counter with respect to the center of said bomb, maintaining the azimuthal positions of said detectors substantially constant during the movement of said bomb, and continuously recording the responses of the respective detectors to the radioactive rays region.

6. The method for determining the distribution of cement containing radioactive material around a casing in a borehole which comprises making a plurality of radioactive measurements inside the casing, each measurement being confined to a selected direction by maintaining the azimuthal position of the detector substantially constant during the measurement, and the different measurements being made in different directions.

7. An apparatus for determining the distribution of radioactive material around a borehole comprising a bomb, a detector for radioactive rays arranged in said bomb, means for shielding said detector from rays except those coming from a selected direction, means for lowering said bomb in a borehole, means at the surface connected to said detector for recording the responses thereof to radioactive rays, and means for maintaining the azimuthal position of said detector substantially constant during the movement of said bomb in the borehole.

LYNN G. HOWELL.
LUDWIG W. BLAU.